(12) United States Patent
Grant

(10) Patent No.: US 6,348,780 B1
(45) Date of Patent: Feb. 19, 2002

(54) FREQUENCY CONTROL OF HYSTERETIC POWER CONVERTER BY ADJUSTING HYSTERSIS LEVELS

(75) Inventor: David Grant, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/668,842

(22) Filed: Sep. 22, 2000

(51) Int. Cl.[7] .............................. G05F 1/10; G05F 1/652; G05F 1/44
(52) U.S. Cl. ..................... 323/222; 323/286; 323/284
(58) Field of Search ................................ 323/222, 223, 323/282, 286, 284, 283

(56) References Cited

U.S. PATENT DOCUMENTS

| 4,009,448 A | * | 2/1977 | Hopwood et al. ............. 331/4 |
| 4,385,241 A | * | 5/1983 | Peddle et al. ................. 307/39 |
| 4,437,146 A | * | 3/1984 | Carpenter ..................... 363/21 |
| 4,458,199 A | * | 7/1984 | Evans et al. ................. 323/286 |
| 4,667,147 A | * | 5/1987 | Wiesgickl ..................... 323/323 |
| 4,757,279 A | * | 7/1988 | Balzano ........................ 331/4 |
| 4,929,882 A | * | 5/1990 | Szepesi ....................... 323/222 |
| 5,959,439 A | * | 9/1999 | Shenai et al. ............... 323/222 |

* cited by examiner

Primary Examiner—Bao Q. Vu
(74) Attorney, Agent, or Firm—Frank D. Cimino; W. James Brady; Frederick J. Telecky, Jr.

(57) ABSTRACT

A power converter is comprised of a hysteretic controller including a feedback circuit that monitors the output frequency of the controller, compares it to a reference generated either internally or externally by the user, and then adjusts the hysteresis of the controller accordingly. The adjusted hysteresis levels will then cause the switching frequency to either increase or decrease thereby controlling the switching frequency of the power supply controller and maintaining it at a desired level.

30 Claims, 4 Drawing Sheets

FREQUENCY CONTROL OF HYSTERETIC POWER CONVERTER BY ADJUSTING HYSTERSIS LEVELS

FIELD OF THE INVENTION

This invention relates generally to power supply converters and more particularly to hysteretic-controlled power supply converters.

BACKGROUND OF INVENTION

Three basic switching power supply topologies commonly used are buck, boost, and buck-boost. Of these, the simplest and most common is the buck converter. A simplified diagram of a buck converter controlled by commercially available controller manufactured by Texas Instruments Incorporated as TI TPS5210 is shown in FIG. 1. The high side driver 50 and the low side driver 60 are alternately driven by the controller in order to increase or decrease the output voltage and maintain the output voltage within a certain desired range.

Various methods have been used to control these power supplies in order to maintain an accurate and stable output voltage. Two of the most common methods are hysteretic control, such as is used by the TPS5210, and pulse width modulation (PWM). Hysteretic controllers, or ripple regulators as they are commonly called, continually monitor the output voltage. If the output voltage is too low, the high side driver (MOSFET 50, for example) is turned on to increase the output voltage and if the output voltage is too high, the high side driver is turned off and a low side driver (MOSFET 60, for example) is turned on to decrease the output voltage. The resultant output voltage is therefore proportional to the ratio of the time the high side driver is on to the time the low side driver is on. If the high side driver is on more than the low side driver then voltage on the output (Vout) is closer to the input voltage than zero volts and if the low side driver is on more than the high side driver then the voltage on the output is closer to zero volts than the input voltage. The main advantage to this method of control is that the transient response of the controller is very good. Hysteretic controllers decide when to turn on these high and low side drivers based solely a direct measurement of the output voltage. If there is a sudden change in the output load, the system can respond very quickly. This is very important for many applications, such as microprocessors and modem DSP systems, which have very large power loads that can change very quickly.

The PWM feedback method is also commonly used to control the high and low side drivers. PWM systems typically use an oscillator to generate a square wave. Depending on the level of output voltage, the "mark-to-space" ratio of that square wave can be changed and the resultant square wave can be used to control the high and low side drivers. PWM schemes have a significant disadvantage, however, in that a substantial time lag is built into this feedback and therefore they do not exhibit a good transient response.

Prior art hysteretic control systems have a significant disadvantage over a PWM system, however, in that they allow a relatively large variability of the switching frequency (switching of the output voltage ripple). Unlike PWM controllers, hysteretic controllers do not have good frequency control. As is shown on the ideal triangle waveform output in FIG. 2a, the output voltage oscillates about the goal voltage and the amplitude of the oscillation is equal to the amount of hysteresis set in the controller. The output voltage waveform in reality is not a clean triangle waveform but looks more like the waveform shown in FIG. 2b. This is due to the finite delay in the feedback of the system. This deviation is not significant but results in some overshoot and undershoot of the set hysteresis levels. In addition and more significantly, although the amplitude of the ripple is relatively fixed by the hysteresis level, the frequency of the ripple can vary and is not necessarily uniform. This is mainly due to the parasitic elements in the circuit, such as the equivalent series resistance (ESR) and equivalent series inductance (ESL) in the output capacitor C2. The size of these parasitics varies significantly and therefore there is a lot of variability among power supply units in the resultant oscillation frequency. This variability is undesirable because at too high a frequency, too much power is dissipated by switching losses in the switching transistors, and at too low a frequency the current peaks will be larger causing the switching transistors to dissipate more power and requiring the power supply inductor to be over-designed. This variation in frequency can be substantially reduced by changes in the ESRs and ESLs associated with the capacitor used in the system. For cheap components these parasitics are quite variable. To make the parasitics small and have the frequency less variable, expensive components must be used. A system must be designed to accommodate both the lowest and highest frequencies that the system might operate at. For prior art hysteretic systems, therefore, expensive capacitors having very small values of ESR and ESL must be specified in order to minimize the variations in operating frequency. This problem associated with prior art hysteretic controllers can therefore be minimized but only at a high cost. Another disadvantage stemming from this difficulty of hysteretic controllers to control switching frequency, is that in some sensitive applications, such as communications, the switch-mode power supply may be required to operate within certain frequency bands in order to avoid unwanted electromagnetic interference generation. The tighter these frequency bands are the more difficult they will be to meet with a hysteretic-controlled system. A PWM controller can easily meet these types of specifications because the oscillator can be fixed at whatever frequency is required and the resulting harmonics will simply be those of the oscillator. This is a significant advantage of the PWM control system over the hysteretic-controlled system. The PWM controller can he arbitrarily set as accurately as required.

An alternative that has been used to deal with this disadvantage of the hysteretic-controlled system is a hybrid PWM/hysteretic control system. This type of controller is normally PWM controlled. If thresholds built into the output voltage are exceeded, however, the hysteretic control circuitry kicks in. The problem with this type of system is that the transient response will suffer because these threshold limits must be set far enough away from the normal operation of the PWM controller in order not to continually trigger the hysteretic control circuitry. In addition, the amount of circuitry and complexity is increased.

Thus there is a need for a power supply controller that has good switching frequency control in addition to a good transient response.

A brief description of a prior art hysteretic-controlled power supply system will now be provided with reference to FIG. 1. FIG. 1 shows a block diagram of a typical buck power supply controlled by a hysteretic-controlled synchronous-buck controller. The hysteretic controller shown in FIG. 1 is a TPS5210 but can be any number of hysteretic controllers currently available. The specific workings of the TPS5210 and buck power stages in switchmode power supplies are described in detail in the following papers available from Texas Instruments Incorporated. These include 1)"Understanding Buck Power Stages in Switchmode Power Supplies", an application report from the Texas Instruments Incorporated, Mixed Signal Products Literature #SLVA057; 2)"Designing Fast Response Synchronous Buck Regulators Using the TPS5210", also an application report from the Texas Instruments Incorporated, Mixed Signal Products Literature #SLVA044; and 3)"High Performance Synchronous Buck EVM Using the TPS5210", a TPS5210 user's guide from the Texas Instruments Incorporated, Mixed Signal Products Literature #SLVU010. The hysteretic controller 10 receives as an input $V_{HYST}$, which sets the hysteresis levels for the hysteretic controller. As is shown in the figure, the level is set by voltage divider 600. Voltage divider 600 is formed by resistors R3 and R4 connected in series between the $V_{REFB}$ voltage input and ground. $V_{HYST}$ is tapped from node 95, located between resistors R3 and R4. Hysteretic controller 10 also receives, as an input, $V_{SENSE}$, generated by feedback from main output voltage, $V_{out}$. Hysteretic controller 10 generates output signals HIGHDR and LOWDR, which are connected to the gates of high driver power MOSFET 50, and low driver power MOSFET 60 respectively. High driver 50 has a drain connected to the HISENSE input of hysteretic controller 10 and also connected to one side of inductor L1 and the top plate of capacitor C1. The other side of inductor L1 is connected to high voltage input, Vin. The bottom plate of capacitor C1 is connected to ground. The source of high driver 50 is connected to the $V_{phase}$ node. The $V_{phase}$ node is also connected to the drain of low driver 60 and to one side of inductor L2. The source of low driver 60 is connected to ground. The other side of inductor L2 is connected to the output voltage node, on which is generated the output ripple voltage. A capacitor C2 is connected between the output voltage node and ground. The output voltage node also has a feedback connection to the $V_{SENSE}$ input.

In operation, the hysteretic controller 10 outputs an active level signal on the HIGHDR output and an inactive level signal on the LOWDR output in order to turn on the high driver 50 and turn off the low driver 60 thereby increasing the voltage on $V_{phase}$ and $V_{out}$. Alternately controller 10 outputs an active level signal on the LOWDR output and an inactive level signal on the HIGHDR output in order to turn on the low driver 60 and turn off the high driver 50 thereby pulling down the voltage on $V_{phase}$ and $V_{out}$. In order to determine when to output these signals and turn on the appropriate driver, the $V_{out}$ signal is fed back to the $V_{SENSE}$ input to the controller. The $V_{SENSE}$ input is used to indicate whether the upper or lower hysteresis level $V_{HI}$ or $V_{LOW}$ in FIG. 2a), has been reached. If one of these hysteresis levels has been reached by the output ripple voltage, $V_{out}$, the hysteretic controller generates the appropriate signals on HIGHDR and LOWDR and thereby tuning on the appropriate driver to pull the output voltage toward the opposite hysteresis level. In this manner, Vout, continues to ripple between the hysteresis levels, $V_{HI}$ and $V_{LOW}$, as shown in FIG. 2a. The overshoot and undershoot, illustrated in FIG. 2b are caused by the delay in the feedback in turning on the appropriate driver to drive the output voltage in the opposite direction. Although the amplitude of the output voltage ripple is controllable by the presence of the fixed hysteresis levels in the controller, the frequency of the ripple is not. The frequency of the ripple can be quite variable depending on the parasitic elements in the power supply.

SUMMARY OF THE INVENTION

These problems associated with current power supply controllers are solved by using a hysteretic controller including a feedback circuit that monitors the output frequency of the controller, compares it to a reference generated either internally or externally by the user, and then adjusts the hysteresis of the controller according to the error measured in the comparison. The adjusted hysteresis levels will subsequently cause the switching frequency to either increase or decrease thereby controlling the switching frequency of the power supply controller and maintaining it at a desired level.

DETAILED DESCRIPTION OF THE PREFERRED EMBODIMENTS

As will be explained in detail below, the switching frequency of a hysteretic-controlled power supply regulator can be controlled by monitoring the operating frequency, comparing that with a reference (such as a current, voltage, or frequency supplied either internally or from an external source) and adjusting the hysteresis levels according to the error measured by the comparison. The adjusted hysteresis levels will change the operating frequency of the converter. Therefore, for example, if it is desired to run the hysteretic controller at some frequency because of interference concerns in a communication application, the system will adjust itself to operate at the target frequency regardless of the loading conditions and parasitic elements in the system.

Figure 3:
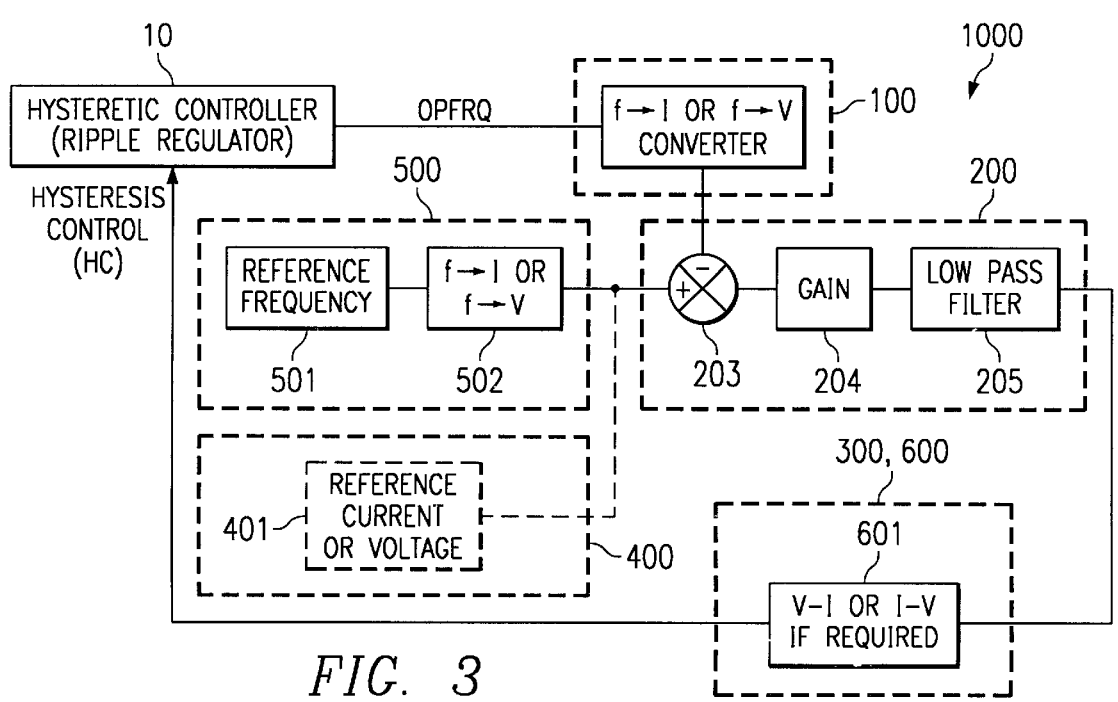
FIG. 3 illustrates in block diagram form a hysteretic controller with a feedback system to control the switching frequency by adjusting the hysteresis level according to a preferred embodiment of the invention.

The first preferred embodiment set forth to achieve this frequency control of hysteretic-controlled power supply controllers, as shown in FIG. 3, compares the frequency, converted to a voltage or current representation thereof, to a reference, the reference being either a voltage or current respectively. That comparison may then be input into a gain block and low pass filter and output to the hysteresis control of a typical hysteresis converter, in whatever form is required by that converter. This embodiment will achieve relatively accurate frequency control with small error (a few percent above or below the desired frequency). For the purposes of ensuring that a power supply is not over-designed this embodiment would be adequate. Also this would be appropriate for use in situations where a switching frequency within certain limits must be maintained and these limits are outside of the small error margin exhibited by the system.

The second preferred embodiment used to achieve frequency control, as illustrated in FIG. 7, makes use of a phase comparator to attain very accurate frequency control. This embodiment will allow the output frequency to be matched with the reference frequency and can achieve very accurate control of the switching frequency.

FIG. 3 shows a block diagram of a first embodiment of the present invention that allows for frequency control of the output ripple in a hysteretic controlled system. This is accomplished by utilizing a feedback circuit 1000 that adjusts the hysteresis levels in response to the frequency variations in the ripple output. Feedback circuit 1000 accepts as an input, an output from the hysteretic controller 10, OPFRQ, representative of the frequency of the system. This signal should indicate that a cycle has been completed. This indicator can be generated in a number of different ways. One possible method, for example, is to detect every time the high side driver is turned on, or every time the low side driver is turned on. This can be done by tapping the HIGHDR signal or the LOWDR signal respectively. Another possible solution is to sense the $V_{phase}$ node in order to determine if $V_{phase}$ has either gone up or down. Yet another method is to tap directly off, $V_{CMP}$, the output of the hysteretic comparator 40 in FIG. 1.

OPFRQ, the signal representative of the frequency of operation of controller 10, must then be compared to a reference. In order to simplify this comparison, the frequency of operation may first be converted to either a current or voltage. This conversion is performed in block 100. The reference frequency may also be converted to either a current or voltage in order to match the type of signal output from block 100. This reference generation and conversion is performed in block 500. Note that the reference frequency or its current or voltage representation thereof need not be generated internally to the system but may be input externally. The respective signals—currents, voltages, or frequencies—are then compared in block 200. Alternatively rather than generating a reference frequency and then converting it, a reference voltage or current can be used directly as shown in block 400. Block 200 consists of a comparator 203, a gain block 204, and a filter block 205. The filter block 205 may be required in a particular implementation to make the system stable. The gain and filter blocks can be conveniently implemented in an integrator as will be described with reference to FIG. 4. The output of block 200 may be either a current or voltage and thus may have to be converted to a voltage or current respectively dependent on the required form of the hysteresis control input of hysteresis controller block 10.

Figure 4:
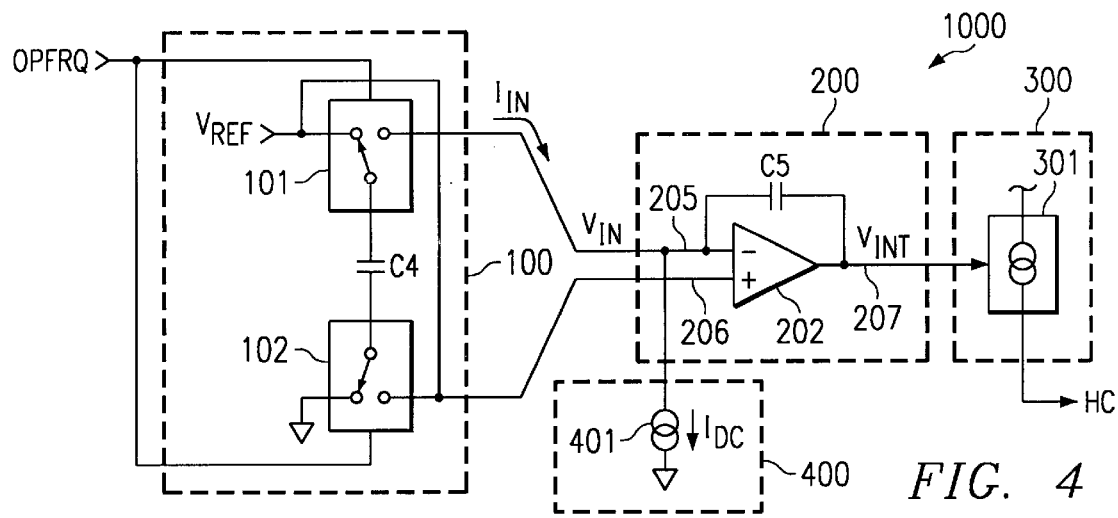
FIG. 4 is an electrical schematic of a feedback system to control the switching frequency by adjusting the hysteresis level according to a preferred embodiment of the invention.

A preferred implementation of the first preferred embodiment of the present invention shown in FIG. 3 is illustrated in FIG. 4. Converter block 100 is shown here as a frequency to current converter. It is comprised of two switches, 101 and 102, and a capacitor C4. Switch 101 is controlled by input signal OPFRQ. The main node of the switch 101 is always connected to the top plate of capacitor C4. The first selectable node of the switch 101 is connected to reference voltage $V_{REF}$, and a second selectable node of the switch 101 is connected to $V_{IN}$, the inverting voltage input node to integrator 202 of block 200. Thus for one phase of input signal OPFRQ, the top plate of capacitor C4 is coupled to $V_{REF}$, and for the opposite phase of input signal OPFRQ, the top plate of capacitor C4 is coupled to $V_{IN}$. Switch 102 is also controlled by input signal OPFRQ. The main node of the switch 102 is always connected to the bottom plate of capacitor C4 The first selectable node of the switch 102 is connected to ground, and a second selectable node of the switch 102 is connected to the noninverting voltage input node 205 of op amp 202 of block 200. Thus for one phase of input signal OPFRQ, the bottom plate of capacitor C4 is coupled to ground, and for the opposite phase of input signal OPFRQ, the bottom plate of capacitor C4 is coupled to the noninverting voltage input node 206 of the op amp 202.

The preferred implementation of block 200 is also shown in FIG. 4. Block 200 includes an integrator. The integrator is made up of an op amp 202, having an inverting input 205 and a noninverting input 206, and a capacitor C5 connected between the inverting input 205 and the output of the op amp 207.

Block 400, which includes a reference current source 401, is used in this preferred implementation, as shown in FIG. 4, rather than the optional reference frequency block 500. The reference current source 401 is connected between the inverting input 205 of the op amp 202 and ground.

Figure 1:
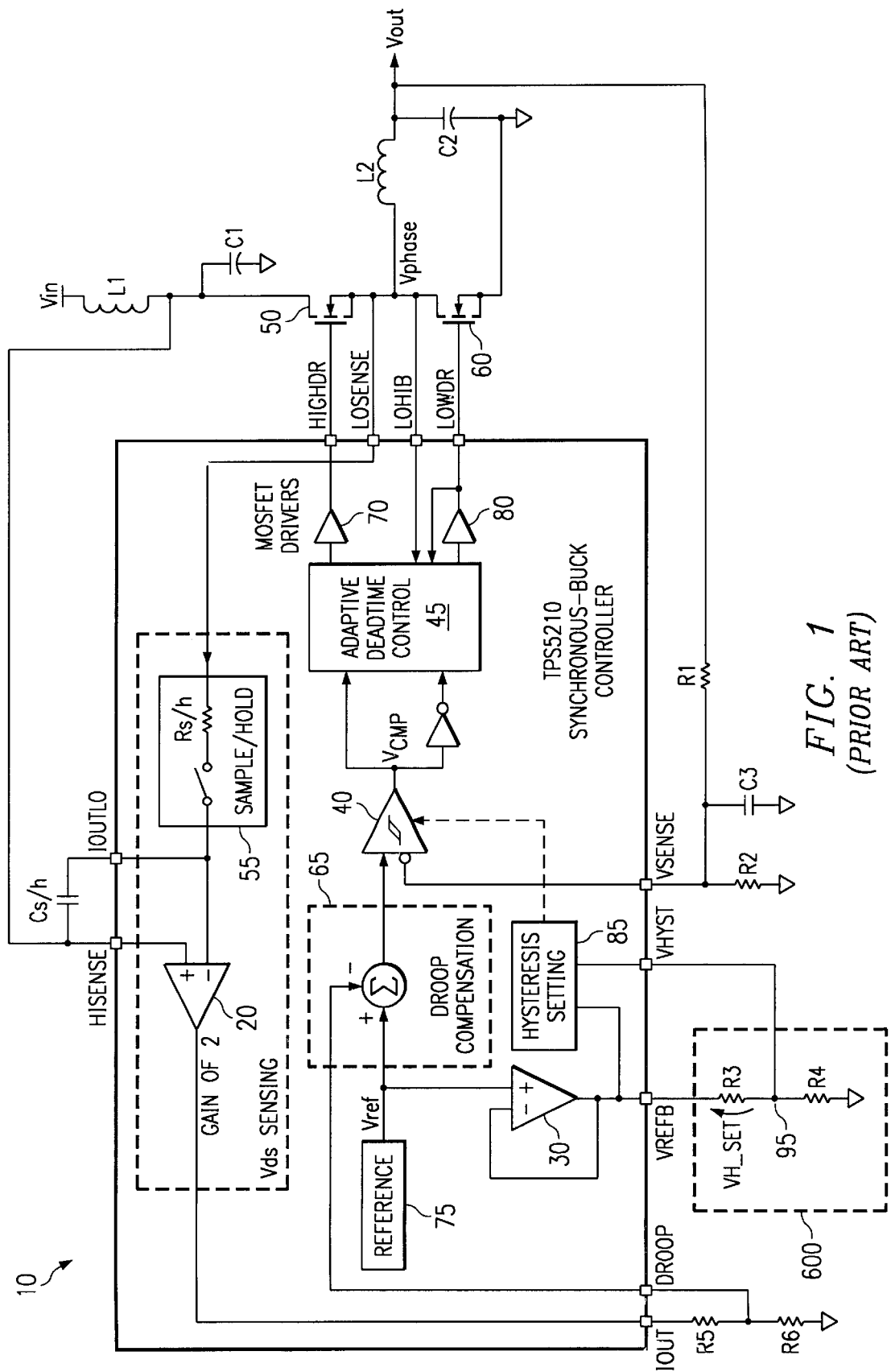
FIG. 1 illustrates in block diagram form a prior art buck boost power supply including a hysteretic-controlled power supply controller.
Figure 2A:
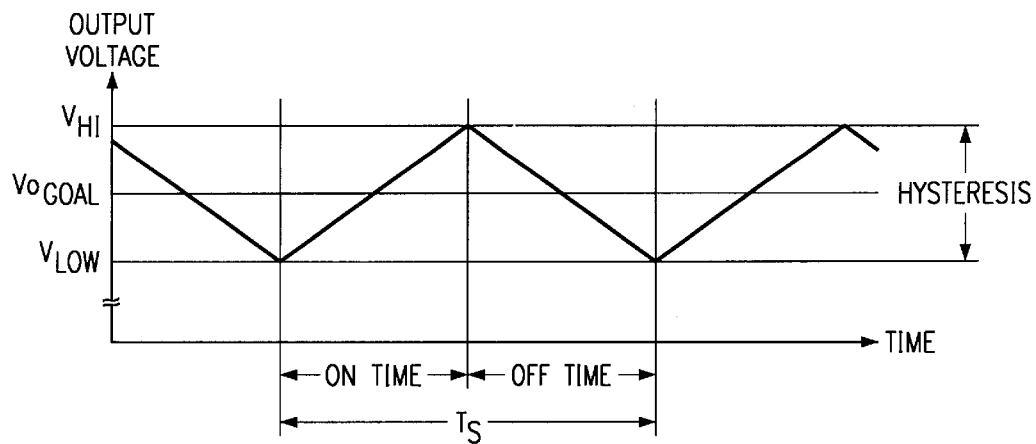
FIG. 2a is an ideal waveform of the output voltage ripple of the power supply and its ideal correlation to the hysteresis band.
Figure 2B:
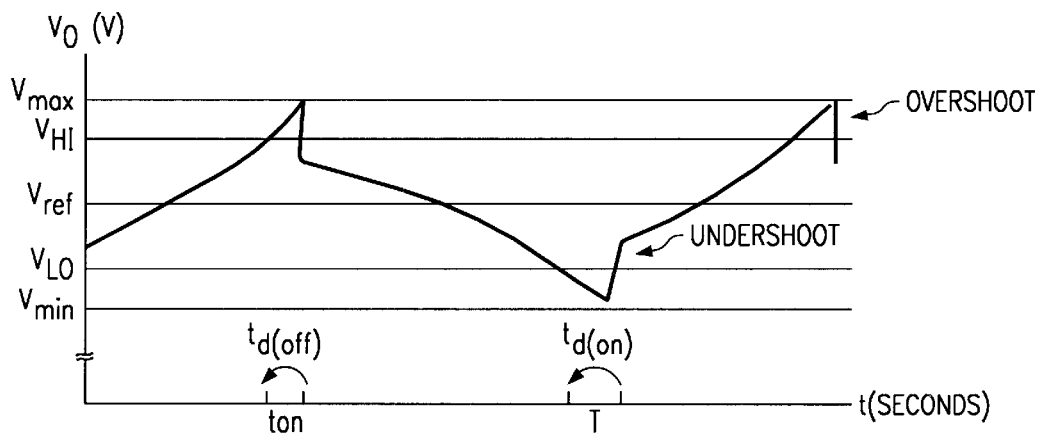
FIG. 2b is a more realistic waveform of the output voltage ripple illustrating the overshoots and undershoots caused by the finite feedback delays in the hysteretic method including the turn-on and turn-off delays of the high and low drivers.

Block 300, which includes a voltage to current converter, is coupled to output 207 of the integrator. Block 300 includes a voltage controlled current source 301 connected between a voltage source or reference and the hysteresis control output HC, and is controlled by the output of block 200. HC is then connected to an input of a hysteresis controller in order to adjust the hysteresis levels of the controller. On the TPS5210, HC is connected to the $V_{HYST}$ input. The signal on HC is converted back to a voltage at the $V_{HYST}$ input, by connecting HC to node 95 located between resistors R3 and R4, as shown in FIG. 1.

The operation of the feedback control system shown in FIG. 4 will now be described. The frequency to current converter block 100 operates as a charge dispensing network to dump a fixed amount of charge into the inverting input 205 of an integrator every time a cycle is complete. The amount of charge dumped must be fixed, but the frequency at which the converter is operating will not be fixed and therefore this frequency will determine the amount of charge dumped over a certain period of time. Dispensing a fixed amount of charge can be accomplished in a number of ways and in the preferred implementation of this embodiment it is done by using capacitor C4 and accompanying switches 101 and 102. The integrator, comprised of capacitor C5 and op amp 202, will work to maintain voltage $V_{IN}$ as a constant voltage. $V_{REF}$ is a constant reference voltage and the value of the capacitance C4 is also constant. Therefore the amount of charge, Q=CV, that is dumped onto the inverting node of the integrator will be constant. More specifically, the cycle pulse, OPFRQ, input to the charge dispensing circuit, controls the switches and allows the capacitor C4 to be charged up to the reference voltage $V_{REF}$ every cycle. Then, once every cycle, this fixed amount of charge stored in capacitor C4 is dumped into the inverting node 205. Note that in operation of the charge dispensing circuitry and integrator, a packet of charge continually input into the inverting node 205 of the integrator will cause the voltage on that node to continue to climb. Therefore, current sink block 400 is arranged to pull out a certain fixed amount of charge from this node. The integrator will increase or decrease output voltage $V_{INT}$ depending on the voltage $V_{IN}$, which the integrator will try to maintain as a constant voltage. Voltage $V_{IN}$, will not be constant, however, if the ripple frequency increases or decreases and the amount of charge dispensed over time is greater than or less than the fixed amount of charge being pull out of the inverting node by the current sink block. This voltage, $V_{INT}$, generated by the integrator represents the error between the input frequency and the target frequency and will be sent to the controller to adjust the hysteresis levels. This adjustment in the hysteresis levels will reduce this error and bring the frequencies closer together.

Figure 5A:
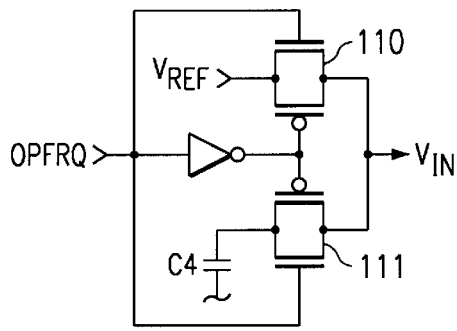
FIGS. 5a and 5b are electrical schemetics of two possible implementations of switches 101 and 102
Figure 5B:
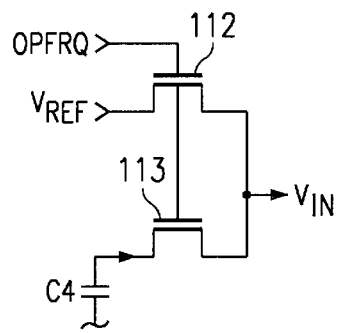

Switches 101 and 102 in block 100 can be constructed a number of ways as is well known in the industry. A couple of examples for switch 101 are shown in Figs. 5a and 5b. The switch in FIG. 5b is comprised of MOS transistors 112 and 113. The switch in FIG. 5a is comprised of full CMOS transmission gates 110 and 111. The switches can be constructed with bipolar transistors instead of MOSFETs if desired.

The integrator in FIG. 4 was constructed using an op amp with a capacitor connected around it. It need not be this sophisticated, however, and may be constructed in any number of ways commonly known and used in the industry. It can even be constructed simply by using a capacitor.

The current sink 401 can be built any number of ways, as is known by one skilled in the art, using FETs or BJTs. Various examples are illustrated in FIGS. 6a–d. It can be made up of a simple resistive element such as a resistor 402 that sinks current from the inverting node 205 to ground. The current sink can also include a single transistor, such as transistor 403 or 404, that is biased on and has a drain-to-source path connected between the inverting node and ground. Alternatively, a more accurate current reference circuit, such as a current mirror circuit shown in FIG. 6d, that tracks a reference current from elsewhere in the circuit can be used. The basic requirement here is to have a current sink that pulls out a relatively constant amount of charge per unit of time (i.e relatively constant current).

Figure 6A:
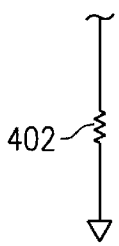
FIGS. 6a–6e illustrate a few examples of circuits that can be used to perform the operation of the current source element 401 in FIG. 4.
Figure 6B:
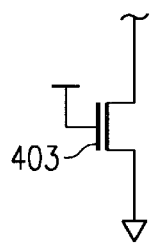
Figure 6C:
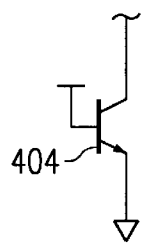
Figure 6D:
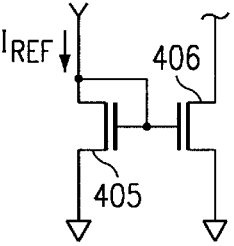
Figure 6E:
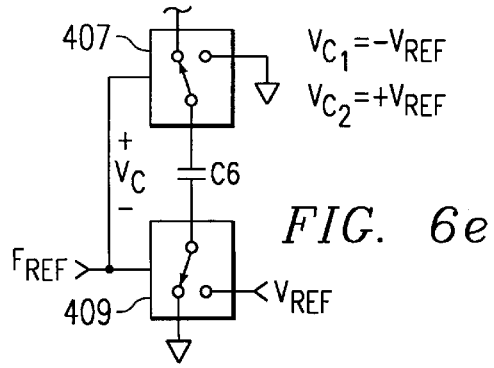

An alternative to a typical current sink circuit as described above, is the use of a capacitor that is switched in and out, such as the one shown in FIG. 6e. This example uses a capacitor C6 of the same value as capacitor C4 in FIG. 4. Capacitor C6 is charged up to a certain voltage, such as $V_{REF}$, and controlled by a clock to pull a certain amount of charge out of the integrating node. Another set of switches, 407 and 409, are used to switch capacitor C6 into the circuit. These switches can be controlled by a reference frequency signal such as $F_{REF}$. For a first state of the switches, the top plate of capacitor 408 is tied to ground and the bottom plate of capacitor C6 is tied to $V_{REF}$. $V_{REF}$ can be the same reference voltage as used in FIG. 3 but need not be. Therefore in this first state, capacitor C6 is charged to $-V_{REF}$. For a second state of the switches, the bottom plate is tied to ground and the top plate is connected to the inverting integrator node 205. The top plate will try to maintain its value of $V_{REF}$ more negative than the bottom plate. Thus, the capacitor C6 will pull charge out of integrating node 205 in order to charge up the capacitor C6 until the voltage on that node is equal to a constant voltage, $V_{REF}$. In the first state, the charge on the capacitor is $$Q_1 = -CV_{c1}$$

where $Q_1$, is the charge on the capacitor C6 in the first state of the switches, C is the capacitance of capacitor C4, and $V_{c1}$ is the charge on capacitor C4 during the first state of the switches.

In the second state $$Q_2 = CV_{c2}$$

where $Q_2$ is the charge on the capacitor C6 in the second state of the switches, C is the capacitance of capacitor C4, and $V_{c2}$ is the charge on capacitor C4 during the second state of the switches.

Therefore the change in charge on the capacitor is:

$$\Delta Q = (Q_2 + Q_1) = C[V_{c2} + V_{c1}]$$

Thus, every time capacitor C6 is flipped, the circuit will pull $\Delta Q$ out of the integrating node. If the capacitors, C6 and C4, are arranged to be the same size, then every time capacitor C4 is pulsed a certain amount of $\Delta Q$ goes into the inverting node and every time capacitor C6 is pulsed that same amount of $\Delta Q$ is pulled out of the inverting node. Thus if the frequency at which charge is dumped in and the frequency at which charge is pulled out is the same, the system is in equilibrium. This would force the system to operate at the same frequency as the reference frequency signal $F_{REF}$ used to switch the capacitor C6 circuit.

Figure 7A:
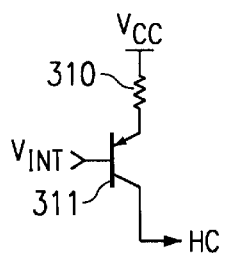
FIG. 7 illustrates a couple of examples of circuits that can be used to perform the operation of the current source block 300 in FIG. 4.
Figure 7B:
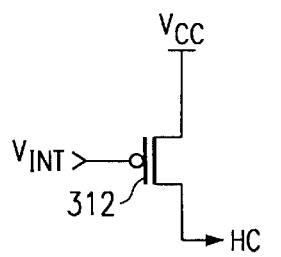

In general, therefore, and referring back to FIG. 4., the $\Delta Q$ that capacitor C4 dumps into the inverting node multiplied by the frequency of operation of switches 101 and 102 provides a current $I_{IN}$, which flows into the inverting node. The system comes into equilibrium when $I_{IN}$ is equal to $I_{DC}$, the current that is pulled out of the inverting node by block 400. If the system is operating at a higher frequency than required for equilibrium, $V_{IN}$, will try to increase and as a result $V_{INT}$ will drop. Current source 301 is controlled by $V_{INT}$ such that when $V_{INT}$ drops, meaning that the frequency of the system is too high, the hysteresis voltage $V_{HYST}$, normally set by $V_{REFB}$ and resistor divider R3/R4, is adjusted. This adjustment is performed by the current output from the controlled current source 301 and input into node 95, located between R3 and R4, such that the frequency of the system is decreased. If the hysteresis voltage $V_{HYST}$ is made larger, then the frequency drops, and, if the hysteresis voltage is made smaller, then the frequency increases. Voltage controlled current source 301 can be constructed as is commonly known in the industry and can be, for example, a bipolar transistor with a resistor in series with its emitter as shown in FIG.7a, or a MOSFET connected as shown in FIG. 7b.

This feedback adjusts the size of the hysteresis in the hysteretic controller in order to control the output frequency. In the case of the TPS5210, the hysteresis levels could be controlled by adjusting the hysteresis voltage input $V_{HYST}$ as described above. Another hysteretic controller, may have different circuitry required to generate the hysteresis voltage input and therefore the required input will be of a different form. The idea behind the control system remains the same however—use a feedback system to adjust the size of the hysteresis in the controller and thereby adjust the frequency of the controller.

Figure 8:
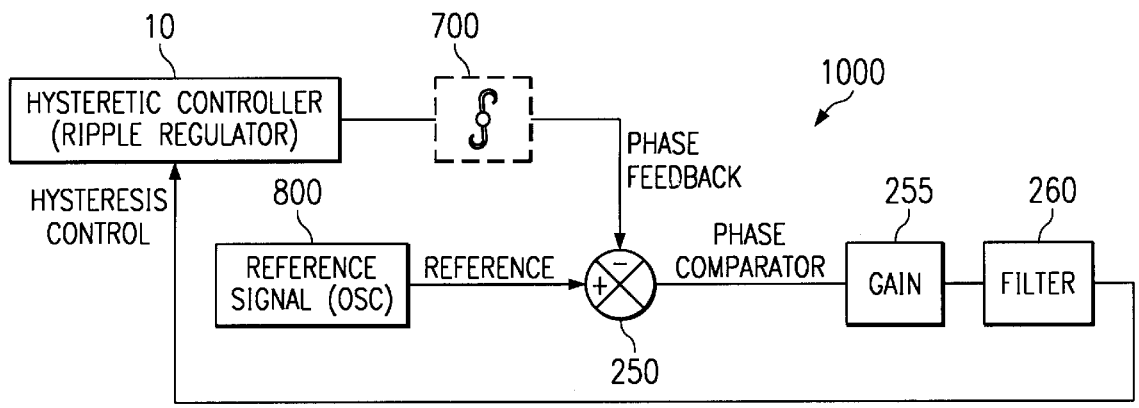
FIG. 8 illustrates in block diagram form a hysteretic controller with a feedback system to control the switching frequency by adjusting the hysteresis level according to a second preferred embodiment of the invention.

FIG. 8 illustrates in block diagram form a second preferred embodiment of the present invention. This embodiment utilizes a phase comparator block to directly compare and match the system frequency with a reference frequency again by adjusting the hysteresis of the controller according to errors detected in the comparison.

With reference to FIG. 8, a feedback signal representative of the frequency of the controller is tapped from the controller and input to the feedback control circuit. Rather than convert the operating frequency to a voltage or current in order to allow a comparison to be performed as was done in the first embodiment, a phase comparator 250 is used to directly compare the phase of the feedback signal and a reference signal. The reference signal should be operating at the required frequency in order for the control circuit to correct the feedback signal and match its frequency to the reference frequency. The reference signal can be an external signal set externally by the user or it can be generated internally by block 800, which comprises an oscillator, for example. The integrator 700 is inherent in the system since phase is by definition the integral of frequency. The phase comparator 250 then compares the phase of these two signals. A voltage or current proportional to the difference in phases of these two signals is output by phase comparator 250. This proportional voltage or current may then be put through a gain block 255 and a filter block 260 and then fed back to the hysteresis controller to adjust the frequency of the hysteresis controller based on the error in phase detected by the phase comparator.

Figure 9A:
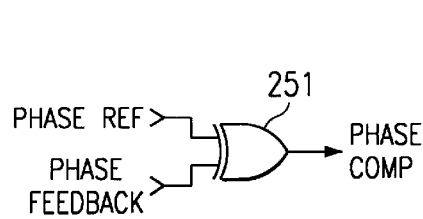
FIGS. 9a and 9b illustrate a couple of examples of the circuits that can be used to perform the phase comparator operation in FIG. 7.
Figure 9B:
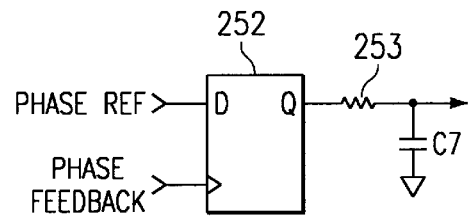

A number of known phase lock loop (PLL) circuits can be used to implement the phase comparison function. Simple circuits that can be used to perform the phase comparison may comprise, for example, an XOR logic gate, as shown in FIG. 9a, which receives the phase reference signal and the feedback signal from the controller and outputs a series of pulses with widths representative of the difference in phase of the two signals being compared. They may also comprise, for example, a D-type flip flop as shown in FIG. 9b. The feedback signal can be input to the control input of the flip flop and the reference signal can be input to the D input. Or the connection can be made in the opposite manner, i.e. the feedback signal into the D input and the reference signal into the control input. Every time there is a rising edge of the feedback signal, the reference signal is sampled. Thus if the feedback signal rises and the reference signal is sampled high, this means that the feedback signal is lagging, the output of the flip flop can then be filtered and used to increase the frequency of the hysteretic controller. This will make the D flip flop sample closer and closer to the rising edge of the reference signal. If it goes beyond the rising edge of the reference signal, then the reference signal will be sampled low, this means that the feedback signal is in advance. In this case the output of the D flip flop can be filtered and used to decrease the frequency of the hysteretic controller. This again will cause the flip flop to sample closer and closer to the rising edge of the reference signal. Many other simple or sophisticated circuits to implement phase comparator 250 known by one of ordinary skill in the art and may be used in this application.

Figure 10:
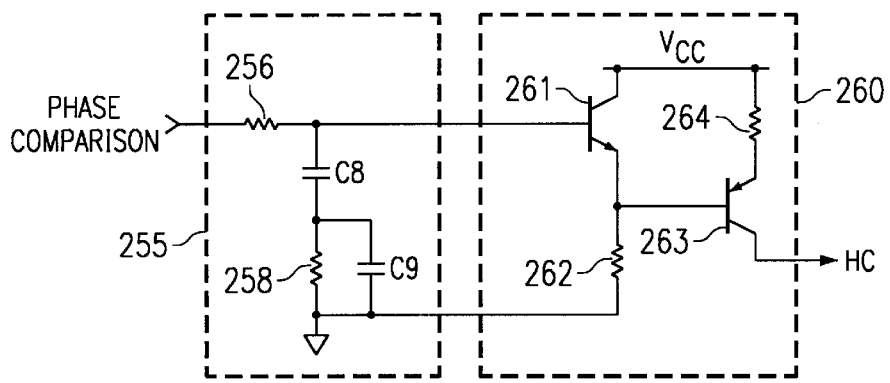
FIG. 10 illustrates an example of a circuit that can be used to perform the operation of the filter block in FIG. 7.

If the phase comparator is part of an analog PLL then the gain and filter blocks, 255 and 260 respectively, should be present. Again there are many known gain and filter blocks that can be used in analog PLL systems. A simple gain block can comprise, for example, the RC network 255 illustrated in FIG. 10. The output from the phase comparator is input to one node of resistor 256. The opposite node of resistor 256 is output to the gain block 60. This node is also connected to the top plate of capacitor C8.

The bottom plate of capacitor C8 is connected to the top plate of capacitor C9 and one node of resistor 258. The other node of resistor 258 and the bottom plate of capacitor C9 are tied to ground. A simple filter block can comprise, for example, the bipolar circuitry 260 illustrated in FIG. 10.

Note the filter block may also be comprised with MOSFETs. The output from the gain block 255 is input to the base of NPN transistor 261. NPN transistor 261 has its collector connected to Vcc and its emitter connected to one node of resistor 262 and the base of PNP transistor 263. The other node of resistor 262 is tied to ground. The emitter of PNP transistor 263 is connected to one node of resistor 264 and the collector of PNP transistor 263 is output to the hysteresis control input of the controller. The other node of resistor 264 is connected to Vcc.

Figure 11:
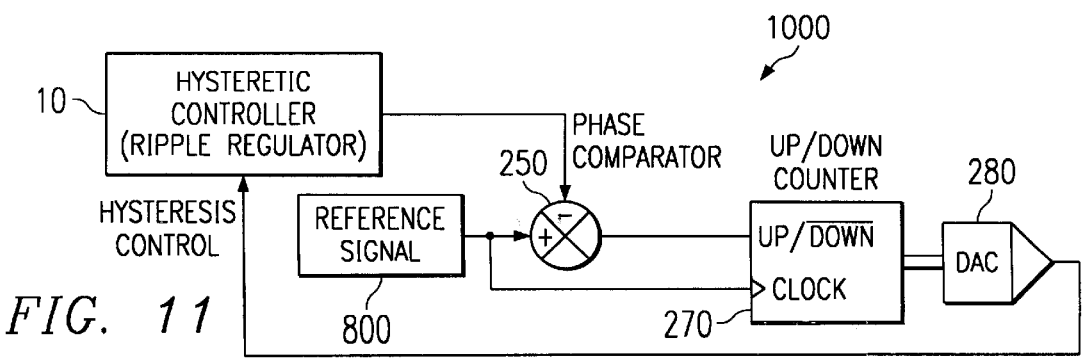
FIG. 11 illustrates a hysteretic controller with a feedback system including an example of a typical digital PLL that can be used to perform the phase comparison and adjustment operation of the feedback circuit.

It is also possible to utilize an entirely digital PLL implementation. Digital PLLs are commonly used in the industry. It may be preferable to use a digital PLL in this application depending on the requirements of the system. An example of an entirely digital PLL implementation is shown in FIG. 11. This example utilizes an up/down counter 270 and a digital to analog converter (DAC) 280. The up/down counter 270 counts up or down depending on whether the phase of the hysteretic controller 10 is leading or lagging. The counter 270 acts as an integrator. If the frequency of the hysteretic controller is too high then the counter 270 counts up, increasing the value output by the DAC 280 and increasing the hysteresis of the hysteretic controller thereby decreasing the frequency. If the frequency of the hysteretic controller is too low, then the counter 270 counts down, decreasing the value output by the DAC 280 and decreasing the hysteresis of the hysteretic controller thereby increasing the frequency. Many other simple or sophisticated all-digital PLL circuits are known by those of ordinary skill in the art and may be used in this application.

Although the present invention has been described in detail, it should be understood that various changes, substitutions, and alterations can be made without departing from the spirit and scope of the invention as defined by the appended claims.

What is claim is:

1. A power converter control circuit comprising:
   a controller circuit connected to control the generation of an output voltage based on set hysteresis levels of the output voltage;
   a feedback circuit connected to the controller circuit, the feedback circuit receiving a first signal representative of the switching frequency of the controller and outputting a correction signal to the controller to adjust the set hysteresis levels.

2. The power converter control circuit of claim 1, wherein the controller circuit receives a second signal representative of the output voltage, the controller circuit generating the output voltage based on the set hysteresis levels by comparing the second signal with the set hysteresis levels to determine if the output voltage has reached the set hysteresis levels.

3. The power converter control circuit of claim 1, wherein the feedback circuit generates the correction signal based on a comparison of the first signal with a reference.

4. The power converter control circuit of claim 3, wherein the first signal is converted to a voltage representation prior to the comparison with the reference and the reference is a voltage reference.

5. The power converter control circuit of claim 3, wherein the power converter control circuit is located on a single integrated circuit and wherein the first signal is converted to a current representation prior to the comparison with the reference and the reference is a current reference generated on the single integrated circuit.

6. The power converter control circuit of claim 1, wherein the feedback circuit comprises an integrator including an inverting input node and a noninverting input node.

7. The power converter control circuit of claim 6, wherein the feedback circuit further includes a charge dispensing circuit coupled to the inverting node of the integrator.

8. The power converter control circuit of claim 1, wherein the feedback circuit includes a phase lock loop (PLL) circuit.

9. The power converter control circuit of claim 8, wherein power converter control circuit is located on a single integrated circuit and the feedback circuit further includes an oscillator located on the integrated circuit and coupled to the input of the phase lock loop (PLL) circuit.

10. A power converter control circuit comprising:
a controller circuit connected to control the generation of an output voltage, the controller receiving a feedback signal from the output voltage and controlling the output voltage based on a comparison of the output voltage with set hysteresis levels;
a frequency feedback circuit connected to the controller, the frequency feedback circuit receiving a signal representative of the switching frequency of the controller, comparing the signal to a reference, and outputting a signal to the controller in order to adjust the set hysteresis levels.

11. The power converter control circuit of claim 10, wherein the frequency feedback circuit includes an integrator circuit to compare the signal to the reference.

12. The power converter control circuit of claim 11, wherein the power converter control circuit is formed on a single integrated circuit and the reference is generated on the integrated circuit.

13. The power converter control circuit of claim 10, wherein the power converter control circuit is formed on a single integrated circuit and the reference is supplied external to the integrated circuit.

14. The power converter control circuit of claim 10, wherein the frequency feedback circuit includes a phase lock loop (PLL) circuit.

15. The power converter control circuit of claim 14, wherein the power coverter circuit is located on a single integrated circuit and the frequency feedback circuit further includes an oscillator located on the integrated circuit and coupled to the input of the phase lock loop (PLL) circuit.

16. A method of controlling the switching frequency of a regulator controller comprising:
generating an output voltage on an output voltage line by comparing the output voltage with set hysteresis levels and based on the comparison generating signals to alternately drive high and low drivers coupled to the output voltage line;
outputting a feedback signal representative of the switching frequency of the high and low drivers;
comparing the feedback signal to a reference;
generating an error signal representative of the difference between the feedback signal and the reference;
using the error signal to adjust the set hysteresis levels.

17. The method of claim 16, wherein the step of comparing the feedback signal to a reference is performed using an integrator.

18. The method of claim 16, wherein the step of comparing the feedback signal to a reference is performed using a phase lock loop (PLL) circuit.

19. The method of claim 16, wherein the phase lock loop (PLL) circuit is a digital phase lock loop (PLL) circuit.

20. The method of claim 16, wherein all of the steps are performed on a single integrated circuit and the reference is also generated on the integrated circuit.

21. The method of claim 16, wherein all of the steps are performed on a single integrated circuit and the reference is supplied externally to the integrated circuit.

22. The power converter control circuit of claim 3, wherein the power converter control circuit is located on a single integrated circuit and wherein the reference is generated on the integrated circuit.

23. The power converter control circuit of claim 3, wherein the power converter control circuit is located on a single integrated circuit and wherein the reference is supplied external to the integrated circuit.

24. The power converter control circuit of claim 23, wherein the first signal is converted to a current representation prior to the comparison with the reference and the reference is a current reference.

25. The power converter control circuit of claim 22, wherein the first signal is converted to a voltage representation prior to the comparison with the reference and the reference is a voltage reference.

26. The power converter control circuit of claim 23, wherein the first signal is converted to a voltage representation prior to the comparison with the reference and the reference is a voltage reference.

27. The power converter control circuit of claim 12, wherein the signal representative of the switching frequency is converted to a voltage representation prior to the comparison with the reference and the reference is a voltage reference.

28. The power converter control circuit of claim 13, wherein the signal representative of the switching frequency is converted to a voltage representation prior to the comparison with the reference and the reference is a voltage reference.

29. The power converter control circuit of claim 12, wherein the signal representative of the switching frequency is converted to a current representation prior to the comparison with the reference and the reference is a current reference.

30. The power converter control circuit of claim 13, wherein the signal representative of the switching frequency is converted to a current representation prior to the comparison with the reference and the reference is a current reference.

* * * * *